United States Patent Office 3,504,254
Patented Mar. 31, 1970

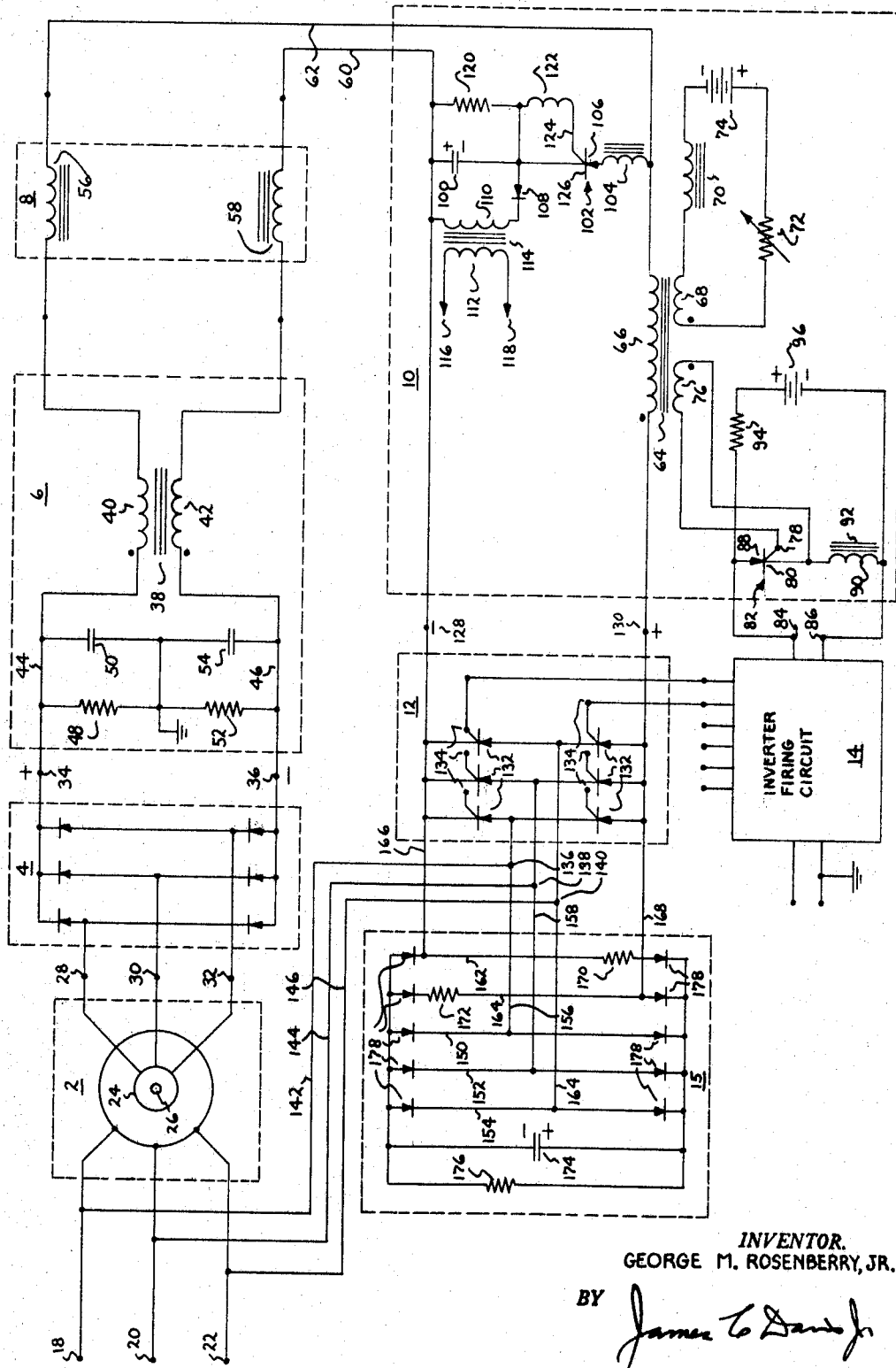

3,504,254
ADJUSTABLE SPEED INDUCTION SYSTEM
George M. Rosenberry, Jr., Schenectady, N.Y., assignor to General Electric Company, a corporation of New York
Filed Jan. 30, 1967, Ser. No. 612,707
Int. Cl. H02p 7/36
U.S. Cl. 318—197                                3 Claims

ABSTRACT OF THE DISCLOSURE

A line-commutated polyphase inverter bridge includes a capacitance in the D-C input thereof which is reversely charged during normal operation and abruptly connected in shunt with the input to rapidly commutate all conducting inverter devices, at any desired instant in the inverter's cycle of operation. The inverter is particularly adapted for use in a polyphase wound rotor induction motor to achieve adjustable speed operation.

PRIOR ART

Line-commutated inverters for many years have been used as means for returning D-C power to an A-C source. By varying the phase angle relationships, the quantity of power exchanged is advantageously varied. Sometimes the D-C power is itself derived from the A-C source, as by rectification. For example, an arrangement of the foregoing kind appears to be attractive for returning a controllable quantity of power from the secondary to the primary of a wound rotor induction motor to provide a correspondingly adjustable speed A-C motor. Power dissipated in the rotor winding resistances, typically provided in present electric machines of this class, represent a sizeable fraction of motor losses, particularly in the low and intermediate speed ranges.

When heretofore known solid-state inverters are used to return electric energy to a source of alternating-current power suitable for driving motors, I have found that inverter malfunctions, occasioned, for example, by usually expected power line disturbances in industrial applications, sometimes result in system failure through destruction of essential components despite the presence of the ordinary system protective devices, even in the D-C loop. I have also discovered that abrupt variations in current occur, through use of solid-state inverters, which are reflected back into the rotor winding where large currents are capacitively coupled to the rotor, providing an objectionable and destructive source of current through the bearings of the motor to ground. Insertion of impedances in series with the inverter output reduces the severity of both problems to some extent but at a disadvantageous sacrifice in effective control of motor speed in most cases.

OBJECTS

Accordingly, an object of this invention is to provide improved means for returning A-C power to a source of the same.

Another object of this invention is to provide a more rapidly responsive inverter protective circuit.

Still another object of this invention is to provide reduced bearing current in a wound rotor motor speed control system having a solid-state inverter for directly returning energy to the source.

BRIEF DESCRIPTION

Briefly, the foregoing principal objects and others that will become apparent are achieved in accord with a preferred embodiment of this invention by providing a protective system having a shunt solid-state current diverting device in the input circuit of the inverter in combination with a solid-state shorting device in the power supply of the inverter firing circuit. Both devices are triggered in response to a sensed overcurrent condition in the inverter input. Preferably, a surge filter is provided in parallel with the inverter output circuit to adsorb the resulting high-power circuit transient. Bearing current is reduced by using balanced series inductances in the inverter input and, preferably, the inverter input is additionally provided through opposing, or bucking, windings of a transformer.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

DRAWING

The figure is a partial schematic circuit diagram of an adjustable speed motor system in accord with the present invention.

DETAILED DESCRIPTION

The principal components of the drive system illustrated in the drawing are enclosed within dashed line blocks and generally include an induction motor 2 of the wound rotor kind; rectifying means 4 connected to the rotor windings of motor 2; bearing current inhibiting means 6 connected to the output of rectifying means 4; balanced inductive means 8 connected in series circuit with the output of the bearing current inhibiting means 6; a solid-state system protective means 10 coupling the output from the balanced inductive means 8 to the input of inverter 12, which is preferably of the conveniently adjustable or variable phase-shift kind as determined by accompanying inverter firing circuit 14. The system shown is completed by means for coupling the output of inverter 12 to the alternating-current supply lines for motor 2, and a shunt surge filter 15 for absorbing or dissipating undesirable and potentially harmful system transients.

Motor 2 provides the means for converting electrical power to useful rotational mechanical power. The stator 16, of motor 2, includes one or more windings adapted to be connected to a suitable source of alternating-current supply, as through motor primary lead terminals 18, 20 and 22. Rotor 24 has a rotatable shaft 26 usable for coupling to a load device (not shown) to be rotatably driven. Rotor 24 is equipped with a rotor winding positioned relative to the stator winding for induction of alternating voltages therein in response to energization of the stator winding. Rotor terminals 28, 30 and 32 are connected to the extremities of the rotor winding, as by brush and slip ring combinations usually employed for this purpose. Both the stator and rotor windings are shown to have three leads, as conveniently provided for three-phase windings, although either or both of the stator and rotor can equally well have more or fewer phases and other lead arrangements.

For converting the alternating voltages at rotor winding terminals 28, 30 and 32 into a unidirectional voltage of corresponding magnitude, there is provided rectifying means 4. In the illustration, rectifier means 4 takes the suitable form of a conventional three-phase, full-wave diode rectifying bridge, with the alternating voltage input thereof connected to terminals 28, 30 and 32 and the unidirectional output available at rectifier output terminals 34 and 36. Operation of the rectifying bridge shown is well known and it is apparent other suitable rectifying circuits can be used therefor. In addition, the rectifying means can be mounted on rotor 24 for rotation therewith, if desired in a particular application.

In the usual setting, the source of electric power for motor 2 includes a grounded neutral which is also connected to the motor frame for safety reasons. Unless otherwise prevented, a current path is established from the A-C source to the inverter 12, from the inverter 12 through the rectifying means 4 to the rotor windings, from the rotor windings through the capacitive coupling to the rotor core, and from the rotor core through the bearings to ground and back to the power source. The high impedance link in this path is the capacitance from the rotor windings to the rotor core. In a typical case, the capacitance would be approximately 0.004 microfarad in a 15 HP motor, for example. At an applied frequency of about 60 c.p.s. adequate limiting impedance would probably be present for most purposes. However, the combination of a highly desirable low impedance D-C path plus the use of a solid state inverter directly coupled (i.e. without substantial intervening impedance) to a low impedance A-C source required for suitable energization of the motor, causes extremely steep wave fronts in the current in the D-C loop. Thus, equivalent frequency components orders of magnitude higher than those usually encountered are present in a system in accord with the present invention. Various bearing shunting schemes can be used to bypass a portion of the resulting relatively high current, although provision within the control loop itself to reduce or cancel the cause of the undesired current is preferable and more effective.

The bearing current inhibiting means 6 includes a transformer 38 having windings 40 and 42 connected, respectively, in series circuit relationship with the D-C busses 44 and 46 connected to terminals 34 and 36, respectively. Parallel connected resistance 48 and capacitance 50 are connected from bus 44 to ground and corresponding resistance 52 and capacitance 54 are similarly connected from bus 46 to ground.

Transformer 38 is advantageously selected to exhibit a relatively high inductance and preferably has a kva. rating equal to ⅛ or more of the equivalent kva. rating of motor 2. The parallel impedance of the resistance-capacitance combinations should be selected to be low relative to the impedance of transformer 38 and the impedance of the preceding rotor circuit (including rectifiers) to ground. To the extent the foregoing criteria are satisfied, all voltage formerly available for causing undesired bearing current is cancelled in windings 40 and 42 of transformer 38. The recommended minimum kva. rating for transformer 38 applies when a neutral grounded source is provided and a much larger rating is required when one line is grounded, making the latter grounding technique correspondingly less attractive for use with systems in accord with the present invention.

Series inductance is required in the D-C loop because of the inverter ripple voltage, particularly when the inverter phase control is set for maximum speed and ripple voltage is also maximized. This ripple voltage tends to cause a circulating current within rectifying means 4 and generally decreases the available torque from the motor 2. The series inductive means 8 preferably includes balanced inductances 56 and 58, of substantially equal inductive value, respectively disposed in the two D-C lines. An appropriate total series inductance for the system, expressed in millihenries, has been found to be about equal to one half of the ratio of inverter line voltage to the maximum peak-to-peak variation in D-C loop current, and the inductive values of inductances 56 and 58 are accordingly advantageously selected on this basis. Values down to one-half of the foregoing have been employed satisfactorily and higher values have been found to provide increased full-loaded speeds. The inductive means 8 also reduces the slope of the current wave fronts in the D-C loop and thereby contributes in this way to reducing bearing current. The balanced network illustrated is preferred as an additional aid in achieving the latter meritorious goal.

The busses 60 and 62 couple the output from inductive means 8 to the input of inverter 12, and a shunt semiconductive switching means 10 provides system protection whenever the current in bus 62 exceeds a predetermined safe value. When actuated, the protective means interrupts current in the semiconductors of the inverter, to permit their return to the non-conducting condition and simultaneously disables the inverter firing circuit so that undesired conduction of the inverter semiconductors is not subsequently re-established before appropriate corrective action can be taken. Operation of the protective means occurs within a small fraction of the conductive cycle of the semiconductors in inverter 12, as required to provide effective system protection, and is generally characterized by a response time in the order of 50 microseconds. Inverter commutation failure is the primary defect requiring rapid remedy and such failure occurs most commonly because of single phasing of the electric supply source, loss of power while under load, or through malfunction of the inverter firing circuit.

The protective means 10 includes means responsive to the instantaneous magnitude of unidirectional current in the inverter input to provide a trigger signal when overcurrent is sensed. A preferred overcurrent sensor comprises a transformer 64 having a primary winding 66 connected in series with one of busses 60 or 62, selected to be bus 62 in the illustration. A single turn suffices for winding 66 in most cases. A first secondary winding 68 provides saturation of transformer 64 in the reverse, or bucking, direction during normal system operation. A suitable power source for winding 68 includes the series combination of an inductance 70, a conveniently adjustable resistance 72, and a source 74 of unidirectional voltage, that can be a battery as illustrated schematically, for example. Upon occurrence of sufficient current in winding 66 to cause transformer 64 to shift from the saturated condition into the unsaturated operating region, a voltage is induced in the second secondary winding 76 of transformer 64, signaling the need for protective action. Toward this end, opposite extremities of winding 76 are connected respectively to the gate 78 and cathode 80 of a semiconductive switchable device 82, as a silicon-controlled rectifier, for example. Switchable device 82 thereupon shunts the power supply input terminals 84 and 86 of inverter firing circuit 14, de-energizing the latter. In the illustration, anode 88 of device 82 is connected to terminal 84 and cathode 80 is connected in series with a winding 90 of a pulse transformer 92 to terminal 86. A suitable source of unidirectional power for inverter firing circuit 14 is illustrated schematically to include a resistance 94 and battery 96 connected in series from terminal 84 to terminal 86.

The above-described portion of the system protective means 10 disables the firing circuit 14 in response to overcurrent in the input of inverter 12 to prevent further triggering of the semiconductive devices therein. In most cases, however, one or more semiconductive devices in inverter 12 are in a conductive condition at the instant of time when it is required that the D-C loop be opened. In order to terminate rapidly conduction in these devices, it is required that current in the forward direction be interrupted long enough for the devices to regain their current-blocking condition (in the order of 50 microseconds). This is achieved, in the illustrated embodiment, through a reversely charged capacitance 100 and switchable semiconductive device 102, shown as a silicon-controlled rectifier, connected in series shunting busses 60 and 62. A small inductance 104 is connected in series with anode 106 of device 102 to limit the initial rate of current rise therein to an acceptable given value.

The reverse charge on capacitance 100 is established by a diode 108 and secondary winding 110, of transformer 114, connected in series across capacitance 100. The corresponding transformer primary winding 112 is connected to a suitable source of alternating current, typically commercial power lines as represented by arrows 116 and 118. A relatively high impedance shunt bleeder resistance 120 completes the capacitance charging network. The secondary winding 122 of pulse transformer 92 is connected from the gate 124 to the cathode 126, of device 102, in such a manner as to render device 102 conductive in response to conduction of device 82. In operation, current otherwise available to input terminals 128 and 130, of inverter 12, is shunted through capacitance 100 and device 102 whenever the latter is triggered into conduction. During the ensuing interval required for capacitance 100 to discharge, the conducting semiconductive devices of inverter 12 recover to their non-conductive states.

Conversion from unidirectional current to alternating current suitable for return to the supply lines is achieved in inverter 12. Inverter 12 includes a plurality of switchable semiconductive devices, as 132, having respective gating electrodes, as 134, connected to inverter firing circuit 14 (only two such connections are illustrated). Firing circuit 14 controls the quantity of power converted by advancing or retarding the firing time of the devices in relation to the line voltages present at the inverter output. In a typical case such control is automatic and in response to one or more sensed conditions, as motor rotor speed, for example.

There are many well-known kinds of firing circuits suitable for use as inverter firing circuit 14, including magnetic amplifier firing circuits and ring counter firing circuits. A preferred type of circuit is the common unijunction slave type firing circuit, employing double or multiple pulsing of each semiconductive device in the inverter each cycle. Circuits of this type particularly lend themselves to rapid shutdown when the power supply voltage thereto is interrupted. A suitable firing circuit is shown and described in my copending application 834,918, which is assigned to the assignee of the present invention.

The alternating-current output from inverter 12 is available at inverter output terminals 136, 138 and 140 which are in turn directly connected by conductive means 142, 144 and 146, to motor line terminals 18, 20 and 22, respectively. An alternative connection that has been found satisfactory, although not representing the presently preferred embodiment of the invention, involves connecting the inverter output to respective intermediate taps (not shown) on the motor 2 armature winding. The latter is somewhat subject to unequal heating with the tapped connections, although a convenient autotransformer-type of voltage stepdown is accomplished in this way when desirable.

High voltage surges, or transients, are likely to occur in the system of this invention as a result of both normal operation and line disturbances present in the usual industrial environment. Some causes of surges include interruption of motor line current by the motor supply circuit breaker (not shown), switching or lighting surges in other branches of the electrical supply, normal commutation of inverter 12, and operation of the static circuit breaker of protective means 10. The latter causes the highest energy surge ordinarily encountered in the system. The presence of surges in the system has a generally adverse effect upon performance and control stability, and in addition presents a hazard to the various circuit elements. Accordingly, in the preferred embodiment of this invention, a surge filter 15 is provided for absorbing the power represented by transient voltage disturbances.

In the drawing, the surge filter means 15 comprises a five-leg, or five-phase, full-wave bridge rectifier and capacitive energy-absorbing means connected to the D-C output thereof. Three of the rectifier legs, or parallel branches, specifically legs 150, 152 and 154, are conductively coupled, as by conductors 156, 158 and 160, to inverter 12 A-C output terminals 136, 138 and 140, respectively. The remaining two legs 162 and 164 of the bridge are conductively connected, as by conductors 166 and 168, to inverter 12 input terminals 128 and 130, respectively. Series voltage-dropping means, as resistances 170 and 172, are advantageously employed in legs 162 and 164, respectively, to minimize exchange of energy from the surge filter to the inverter input during normal system operation. The D-C load for the filter bridge includes a parallel connected capacitor 174 and bleeder resistance 176. Capacitor 174 is preferably a large electrolytic kind, for example, 4000 microfarads, and a much smaller parallel capacitance of lesser inductance (not shown) can be used advantageously in most cases to complete the capacitive load. The resulting assembly can be seen to be a surge filter wherein individual rectifier bridge legs are provided for respective connection of their A-C input terminals to each of the input and output terminals of inverter 12, with the D-C output of the bridge coupled to a capacitive surge absorber. The individual rectifying diodes, as 178, need only have a relatively low average power rating because the required duty cycle is brief. A precharging circuit (not shown) for capacitance 174 is advantageously provided to bring the capacitor up to operating potential during the motor start cycle. A charging circuit of the kind illustrated for capacitance 100 can be used, for example.

Typical operation of the surge filter means 15 will be described in conjunction with a circuit protective actuation of means 10, because this represents the most severe test condition. Prior to the sensed overcurrent condition, and during normal circuit operation, capacitor 174 is charged substantially to the peak excursion, either positive or negative, of the supply voltage applied to motor 2 input terminals 18, 20 and 22. Voltage transients of either polarity in the A-C supply lines or in the D-C busses 166 and 168 which exceed the steady-state charge on capacitance have their energy absorbed by further charging of capacitance 174, and subsequent dissipation in resistance 176. Some voltage rise across capacitance 174 is required to absorb the transient; however, if the capacity thereof is made large relative to the transient energy to be absorbed, the increased voltage is not great and voltage increases of less than 40 percent have been readily achieved in practical circuits under severe transient conditions.

When the current in line 62 becomes excessive, semiconductive device 102 is triggered to become conductive, as previously described. Capacitance 100 was previously reversely charged, relative to the normal polarity of the D-C lines, to a voltage having a magnitude in excess of the peak inverter output voltage magnitude or steady-state charge on capacitance 174. Accordingly, the polarity of inverter input terminals 128 and 130 is reversed and increased to a magnitude greater than the peak supply voltage, a portion of the energy in capacitor 100 is delivered to capacitor 174, and each of the semiconductive devices 132 in inverter 12 is back-biased and becomes non-conductive (in less than 50 microseconds in the typical case). At the next event the voltage across capacitor 100 has been reduced to a value at which energy transfer to capacitor 174 no longer occurs, and the remaining energy therein is added to the inductive energy already present in inductances 56 and 58 of inductive means 8. Simultaneously, inductive energy in the supply lines and motor 2 armature winding cause a rise in voltage at terminals 136, 138 and 140, tending to re-establish the interrupted current in the inverter, and a major portion of this inductive energy is accordingly transferred to capacitor 174. The final energy-absorbing event occurs when capacitor 100 has fully discharged and inductances 56 and 58 (and the motor 2 rotor inductance) restore the original polarity relationship between terminals 128 and 132 and increase the voltage difference therebetween to the magnitude at which the considerable inductive energy stored in inductances 56 and 58 is thereafter transferred to capacitor 174. In this way, surge filter means 15 aids turnoff of the semiconductive devices in inverter 12, absorbs inductive energy in the A-C load served by the inverter 12, and absorbs inductive energy in the D-C supply to inverter 12, all enabling a very rapid and safe shutdown for the inverter 12 when required.

Many modifications of my invention will occur to those skilled in the art. For examples, the surge filter or protective switching means are advantageously used alone with the semiconductive inverter in many applications and the bearing filter need not include the bucking transformer in applications where economy is a paramount consideration. Also, the system of this invention has been found to lend itself readily to various dynamic braking arrangements which are advantageously used, particularly when high inertia loads are involved.

The foregoing is a description of an illustrative embodiment of the invention, and it is applicant's intention in the appended claims to cover all forms which fall within the scope of the invention.

What I claim as new and desire to secure by Letters Patent of the United States is:

1. An adjustable speed induction motor system comprising:
    (a) an induction motor of the wound rotor kind having a stator winding adapted to be connected to a source of alternating-current power and having a rotor winding equipped with output leads and positioned relative to said stator winding for induction of alternating voltages therein in response to energization of said stator winding by said source;
    (b) rectifier means connected to the output leads of said rotor winding and converting alternating voltages induced therein to unidirectional voltages;
    (c) a variable phase inverter, for converting unidirectional power to alternating current power, having an output connected to said stator winding; and,
    (d) coupling means including solid-state system protective means connecting the output of said rectifier means to the input of said inverter;
    (e) whereby a variable quantity of power is returned from said rotor winding to said source adjust the rotational torque of said rotor; said solid-state system protective means comprises sensing means coupled to the input of said inverter and responsive to the instantaneous magnitude of input current thereto to provide an inverter disabling output signal in the presence of sensed circuit excursions exceeding a predetermined magnitude.

2. The system of claim 1 wherein said solid-state system protective means comprises a semiconductive switchable device connected in series in a current path shunting said coupling means.

3. The system of claim 1 including surge filter means connected to the input and output of said inverter.

References Cited

UNITED STATES PATENTS

| | | | |
|---|---|---|---|
| 2,707,258 | 4/1955 | Boyer et al. | 318—197 |
| 3,136,937 | 6/1964 | Miljanic | 318—197 |
| 3,148,320 | 9/1964 | Davis | 318—197 XR |
| 3,394,299 | 7/1968 | Lawn et al. | 321—11 |

ORIS L. RADER, Primary Examiner

GENE RUBINSON, Assistant Examiner

U.S. Cl. X.R.

318—237